(12) United States Patent
Lin

(10) Patent No.: US 7,440,261 B2
(45) Date of Patent: Oct. 21, 2008

(54) POWER REGULATOR WITH A BYPASS AND SPLICE CAPABILITY

(76) Inventor: Saul Lin, No. 21, Jentzu 7 St., Jenwu Hsiang, Kaohsiung Hsien (TW)

( * ) Notice: Subject to any disclaimer, the term of this patent is extended or adjusted under 35 U.S.C. 154(b) by 211 days.

(21) Appl. No.: 11/583,595

(22) Filed: Oct. 19, 2006

(65) Prior Publication Data

US 2008/0094783 A1    Apr. 24, 2008

(51) Int. Cl.
*H05K 7/20* (2006.01)
*H02P 1/26* (2006.01)
*H02B 1/26* (2006.01)

(52) U.S. Cl. .......... 361/622; 361/626; 361/697; 361/702; 361/703; 318/718; 318/722

(58) Field of Classification Search .......... 361/622, 361/626, 679, 688, 690, 697, 702, 703, 709, 361/160, 170, 172; 439/485, 487; 318/718, 318/722, 798, 806
See application file for complete search history.

(56) References Cited

U.S. PATENT DOCUMENTS

| | | | | | |
|---|---|---|---|---|---|
| 3,573,580 | A | * | 4/1971 | Shinozaki | 318/778 |
| 4,243,894 | A | * | 1/1981 | Kuntner et al. | 307/147 |
| 4,634,951 | A | * | 1/1987 | Kampf et al. | 318/778 |
| 4,636,702 | A | * | 1/1987 | Hedges | 318/729 |
| 4,943,890 | A | * | 7/1990 | Schaltenbrand et al. | 361/709 |
| 5,003,242 | A | * | 3/1991 | Liber | 318/778 |
| 5,206,572 | A | * | 4/1993 | Farag et al. | 318/778 |
| 5,337,214 | A | * | 8/1994 | Lindsey et al. | 361/709 |
| 5,448,442 | A | * | 9/1995 | Farag | 361/24 |
| 5,838,144 | A | * | 11/1998 | Wills et al. | 323/238 |
| 6,087,800 | A | * | 7/2000 | Becker et al. | 318/778 |
| 6,163,129 | A | * | 12/2000 | Younger et al. | 318/799 |
| 6,236,566 | B1 | * | 5/2001 | Regnier et al. | 361/699 |
| 6,326,761 | B1 | * | 12/2001 | Tareilus | 318/722 |
| 6,351,113 | B1 | * | 2/2002 | Becker et al. | 324/117 H |
| 6,580,609 | B2 | * | 6/2003 | Pautsch | 361/698 |
| 6,586,905 | B1 | * | 7/2003 | Johnson | 318/778 |
| 6,956,742 | B2 | * | 10/2005 | Pfeifer et al. | 361/709 |
| 7,015,849 | B2 | * | 3/2006 | Nonaka | 341/155 |
| 7,149,064 | B2 | * | 12/2006 | Nolden et al. | 361/23 |
| 7,239,513 | B2 | * | 7/2007 | Lin | 361/697 |
| 2006/0238975 | A1 | * | 10/2006 | Lin | 361/697 |

FOREIGN PATENT DOCUMENTS

| | | | |
|---|---|---|---|
| EP | 446936 A2 | * | 9/1991 |
| EP | 1511165 A2 | * | 3/2005 |
| JP | 06245559 A | * | 9/1994 |

* cited by examiner

*Primary Examiner*—Anatoly Vortman
(74) *Attorney, Agent, or Firm*—Jackson Walker, LLP

(57) ABSTRACT

A power regulator with a bypass and splice capacity includes at least one phase member and a driver. Each one of the at least one phase member includes two cooling fins, two SCR thyristors, a conductive resilient tab and a conductive rigid tab. The cooling fins are conductive and adjacent to each other. The SCR thyristors are mounted on the cooling fins and are inversely connected in parallel to each cooling fin. The conductive resilient tab is mounted on one of the cooling fins and has a moveable contact. The conductive rigid tab is mounted on the other cooling fin and has a stationary contact aligned with the movable contact. When the driver is energized, the driver drives the conductive resilient tab and the moveable contact is contacts the stationary contact and power is bypassed and spliced through the cooling fins.

12 Claims, 8 Drawing Sheets

POWER REGULATOR WITH A BYPASS AND SPLICE CAPABILITY

BACKGROUND OF THE INVENTION

1. Field of Invention

The present invention relates to a power regulator, and more particularly to a power regulator with a bypass and splice capability that can bypass and splice a power connection and reduce heat generated by the power regulator when full power output is achieved.

2. Description of the Related Art

Many electrical power devices such as motors use power regulators to adjust power instead of energizing the motors directly by relays. The power regulators can increase and decrease input voltage gradually when the motors are turned on and off. This prevents damaging the motors by avoiding sudden increases and decreases in torque applied to the motors. Conventional power regulators use SCR (silicon controlled rectifiers) thyristors as power regulation elements to regulate power. In an early design, all electrical current always passes through the SCR thyristors because no bypass relays are built into the power regulators. Consequently the SCR thyristors generate a lot of heat, and large cooling fins are needed. This increases the power regulators' volume and shortens the SCR thyristors' life span.

With reference to FIG. 8, SCR thyristors and bypass relays are built into a power regulator to overcome the problems of the early design. A conventional power regulator in accordance with the prior art comprises two control boards (50, 52), a relay connecting board (53), a triggering loop board (58), three relays (51) and three SCR (silicon controlled rectifiers) thyristor boards. The relays (51) are mounted on the relay connecting board (53) and have an input terminal and an output terminal. The SCR thyristor boards are mounted on the triggering loop board (58), correspond to the relays (51) and comprise a circuit board (54), two SCR thyristors (55, 56), Cu—Pt leads, two cooling fins (60), an input conductive element (57) and an output conductive element (59). The circuit board (54) has an input end and an output end. The SCR thyristors (55, 56) are mounted on the circuit board (54), inversely join each other in parallel and have a rear side, an input terminal and an output terminal. The input and output terminals of the SCR thyristors (55, 56) are connected to the corresponding input and output terminals of the relays (51) through the Cu—Pt leads. The cooling fins (60) are mounted respectively on the rear sides of the SCR thyristors (55). The input conductive element (57) is mounted on the input end of the circuit board (54) and is connected to the relay connecting board (53). The output conductive element (59) is mounted on the output end of the circuit board (54) and connected to the relay connecting board (53).

When a motor attached to the conventional power regulator is run for an extended time, the relays (51) in the conventional power regulator are energized and electrical current passes through the relays (51) to reduce heat generated by the SCR thyristors (55, 56) and prolong the SCR thyristors' life span. However, because the relays' (51) volume is rather large, space for the cooling fins (60) of the SCR thyristors (55, 56) in the power regulator is limited. Furthermore, connection between the relays (51) and the SCR thyristors (55, 56) through the Cu—Pt leads is not stable enough, and layout of the conventional power regulator is complicated.

To overcome the shortcomings, the present invention provides a power regulator with a bypass and splice capability to mitigate or obviate the aforementioned problems.

SUMMARY OF THE INVENTION

The primary objective of the present invention is to provide a power regulator with a bypass and splice capability that can eliminate components, reduce volume of the power regulator and simplify layout of the power regulator.

A power regulator with a bypass and splice capability comprises a case, a phase member and a driver. The at least one phase member is mounted in the case, and each phase member comprises two cooling fins, two SCR thyristors, a conductive resilient tab and a stationary contact. The cooling fins are conductive and adjacent to each other, and each cooling fin has an upper edge, a lower edge, two surfaces, an inner edge and multiple transverse recesses. The inner edge of one cooling fin is opposite to and aligned with the inner edge of the other cooling fin. The transverse recesses are defined in the surfaces of the cooling fins.

The SCR thyristors are mounted respectively on the cooling fins, are inversely connected to each other in parallel, and each has an anode and a cathode. The anode is mounted on one of the cooling fins and the cathode is mounted on the other cooling fin.

The conductive resilient tab is mounted on one of the cooling fins, extends over the other cooling fin and has a moveable contact formed on the conductive resilient tab and facing the other cooling fin.

The stationary contact is mounted on the other cooling fin and aligns with the movable connection point.

The driver is mounted in the case and is connected to the conductive resilient tab. When the driver is energized, the conductive resilient tab is driven by the driver, and the moveable contact is attached to the stationary contact. Power is bypassed and spliced through the cooling fins, and the cooling fins serve as bypass relays.

Other objectives, advantages and novel features of the invention will become more apparent from the following detailed description when taken in conjunction with the accompanying drawings.

DETAILED DESCRIPTION OF THE INVENTION

Figure 1:
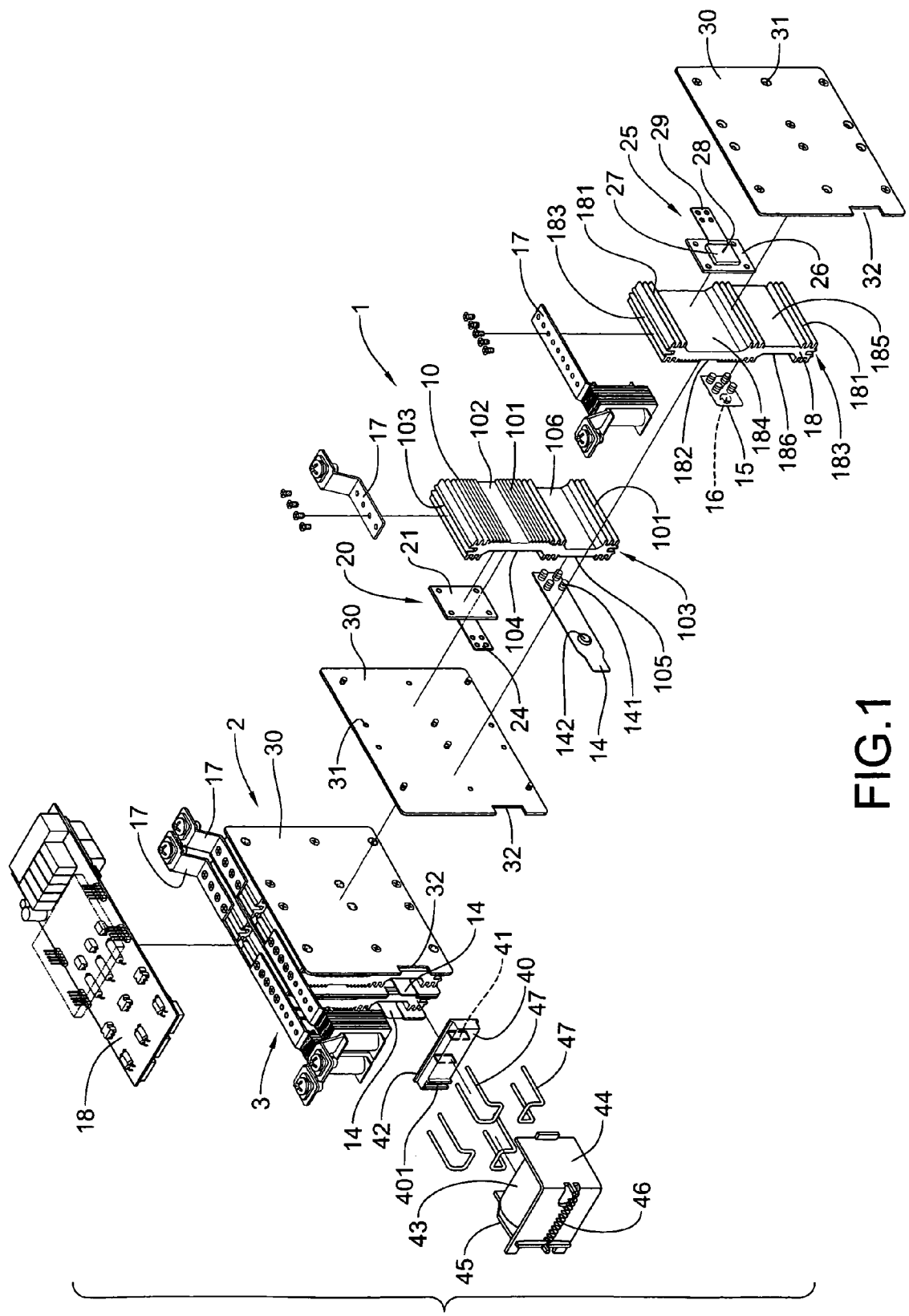
FIG. 1 is an exploded perspective view of a first embodiment of a power regulator with a bypass and splice capability in accordance with the present invention.
Figure 2:
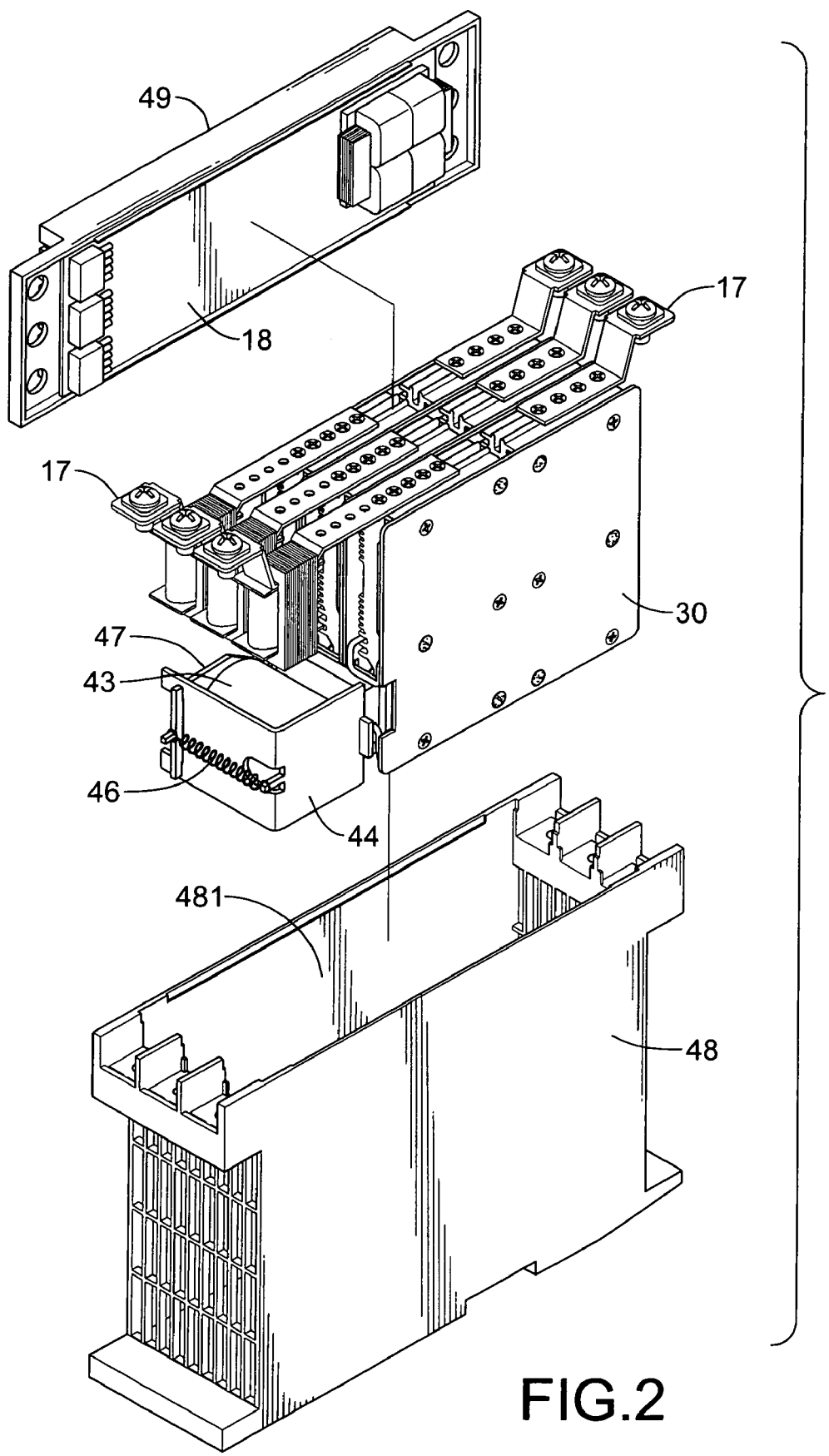
FIG. 2 is an exploded perspective view of the power regulator in FIG. 1.
Figure 3:
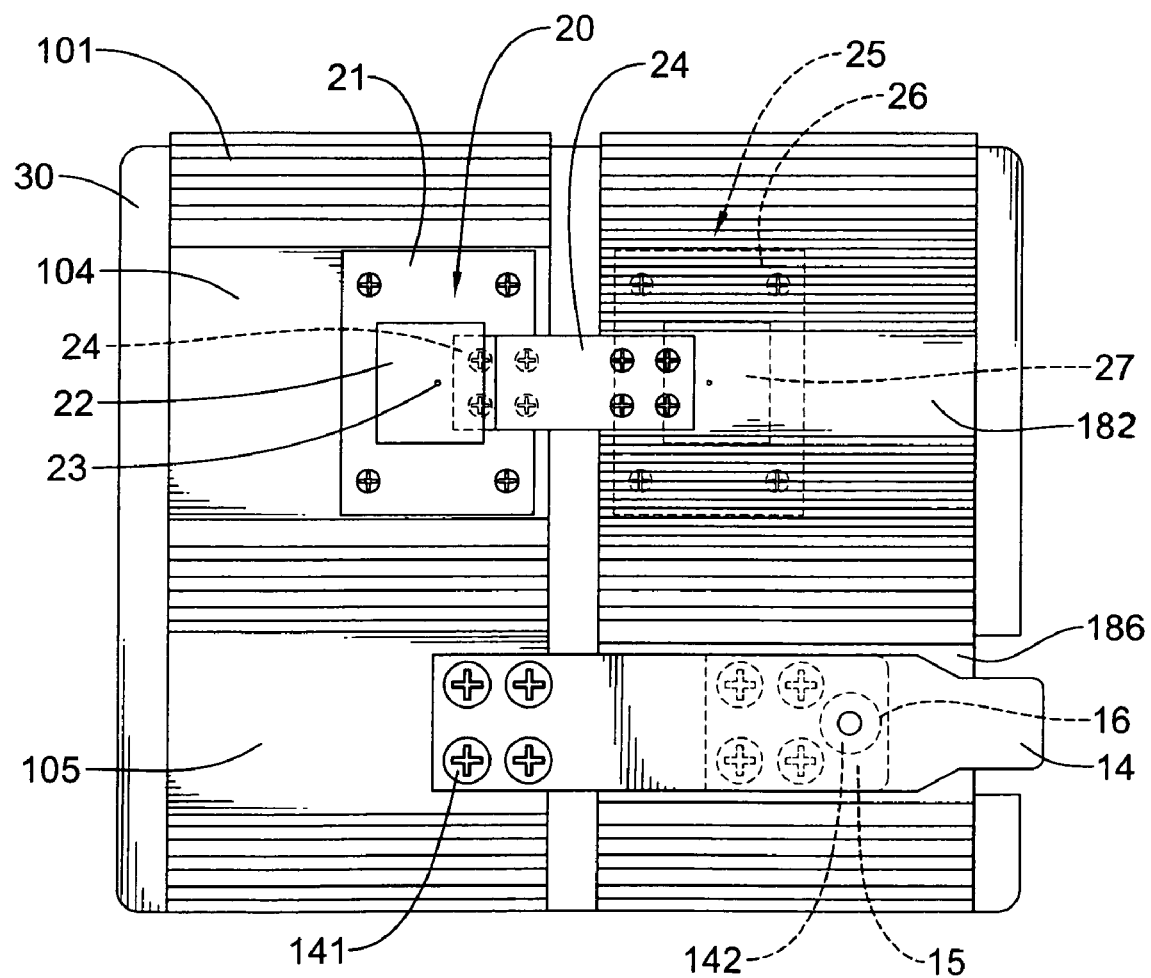
FIG. 3 is a side view of a phase member of the power regulator in FIG. 1.
Figure 4:
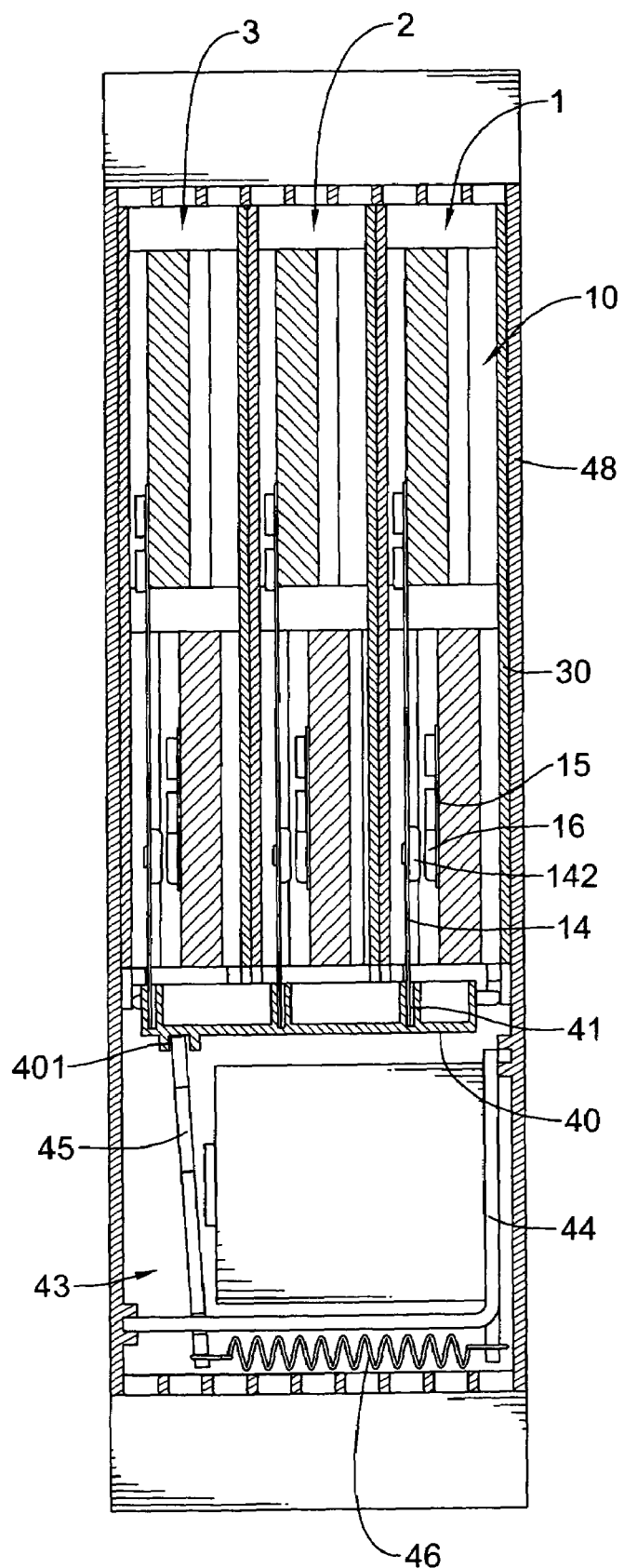
FIG. 4 is a side view in partial section of the power regulator in FIG. 1.
Figure 5:
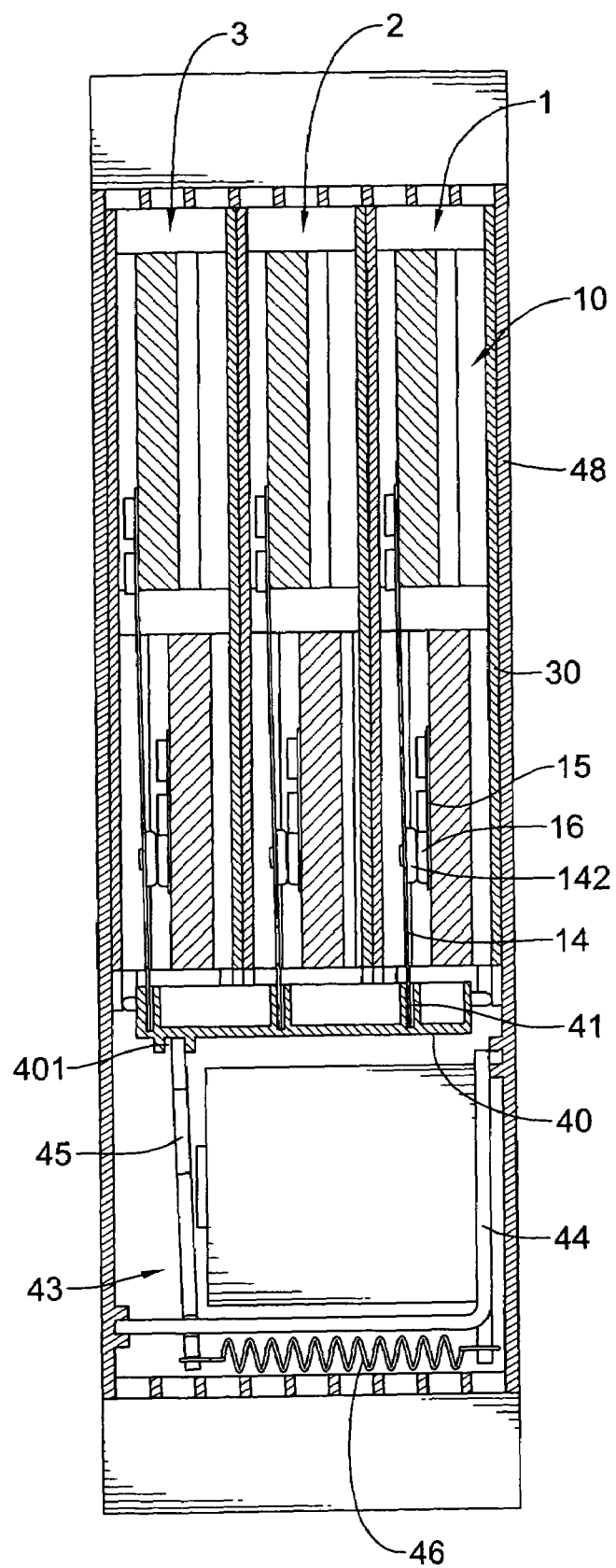
FIG. 5 is an operational side view in partial section of the power regulator in FIG. 1 with a driver energized.

With reference to FIGS. 1, 2, 3, 4 and 5, a power regulator with a bypass and splice capability in accordance with the present invention comprises a case, at least one phase member (1, 2, 3) and a driver.

The case may comprise a body (48), a cover (49) and a control circuit board (18). The cover (49) is mounted on the body (48). The control circuit board (18) is mounted in the cover (49).

The at least one phase member (1, 2, 3) is mounted in the body (48) of the case and is controlled by the control circuit board (18). Each phase member (1, 2, 3) comprises a first cooling fin (10), a second cooling fin (18), a first SCR thyristor (20), a second SCR thyristor (25), a conductive resilient tab (14) and a conductive rigid tab (15) and may have two conductive frames (17) and two positioning boards (30). In first and second embodiments of the power regulator in accordance with the present invention, the power regulator comprises three phase members (1, 2, 3). In a third embodiment of the power regulator in accordance with the present invention, the power regulator comprises a single phase member.

The first cooling fin (10) is conductive and has an upper edge, a lower edge, a first face, a second face, an inner edge, an outer edge, a first transverse recess (104), a second transverse recess (102), an optional third transverse recess (105), an optional fourth transverse recess (106), multiple optional ridges (101), multiple optional grooves and two optional mounting slots (103). The transverse recesses (104, 102, 105, 106) are defined in the faces of the first cooling fin (10). The ridges (101) are formed on the faces of the first cooling fin (10) adjacent to the transverse recesses (104, 102, 105, 106). The grooves are defined between the ridges (101). The mounting slots (103) are defined respectively in the upper and lower edges of the first cooling fin (10).

The second cooling fin (18) is conductive, is arranged side-by-side to the first cooling fin (10) and have an upper edge, a lower edge, a first face, a second face, an inner edge, an outer edge, a first transverse recess (184), a second transverse recess (182), an optional third transverse recess (185), an optional fourth transverse recess (186), multiple optional ridges (181), multiple optional grooves and two optional mounting slots (183). The first face of the second cooling fin (10) corresponds to and is aligned with the first face of the first cooling fin (10). The second face of the second cooling fin (18) corresponds to and is aligned with the second face of the first cooling fin (10). The inner edge of the second cooling fin (18) faces and is adjacent to the inner edge of the first cooling fin (10). The transverse recesses (184, 182, 185, 186) are defined in the faces of the second cooling fin (18) and align with transverse recesses (104, 102, 105, 106) in the faces of the first cooling fin (10). The ridges (181) are formed on the faces of the second cooling fin (18) and are adjacent to the transverse recesses (184, 182, 185, 186). The grooves are defined between the ridges (181). The mounting slots (183) are defined respectively in the upper and lower edges of the cooling fin (18).

In the first embodiment, the first cooling fin (10) has a first transverse recess (104), a second transverse recess (102), a third transverse recess (105) and a fourth transverse recess (106). The first transverse recess (104) is formed in the first face of the first cooling fin (10). The second transverse recess (102) is formed in the second face of the first cooling fin (10). The third transverse recess (105) is formed in the first face of the cooling fins (10). The fourth transverse recess (106) is formed in the second face of the cooling fin (10).

The second cooling fin (18) has a first transverse recess (184), a second transverse recess (182), a third transverse recess (185) and a fourth transverse recess (186). The first transverse recess (184) is formed in the second face of the second cooling fin (18) and is aligned with the second transverse recess (102) on the first cooling fin (10). The second transverse recess (182) is formed in the first face of the second cooling fin (18) and is aligned with the first transverse recess (104) on the first cooling fin (10). The third transverse recess (185) is formed in the second face of the second cooling fin (18) and is aligned with the fourth transverse recess (106) on the first cooling fin (10). The fourth transverse recess (186) is formed in the first face of the second cooling fin (18) and is aligned with the third transverse recess (105) in the first cooling fin (10).

Figure 6:
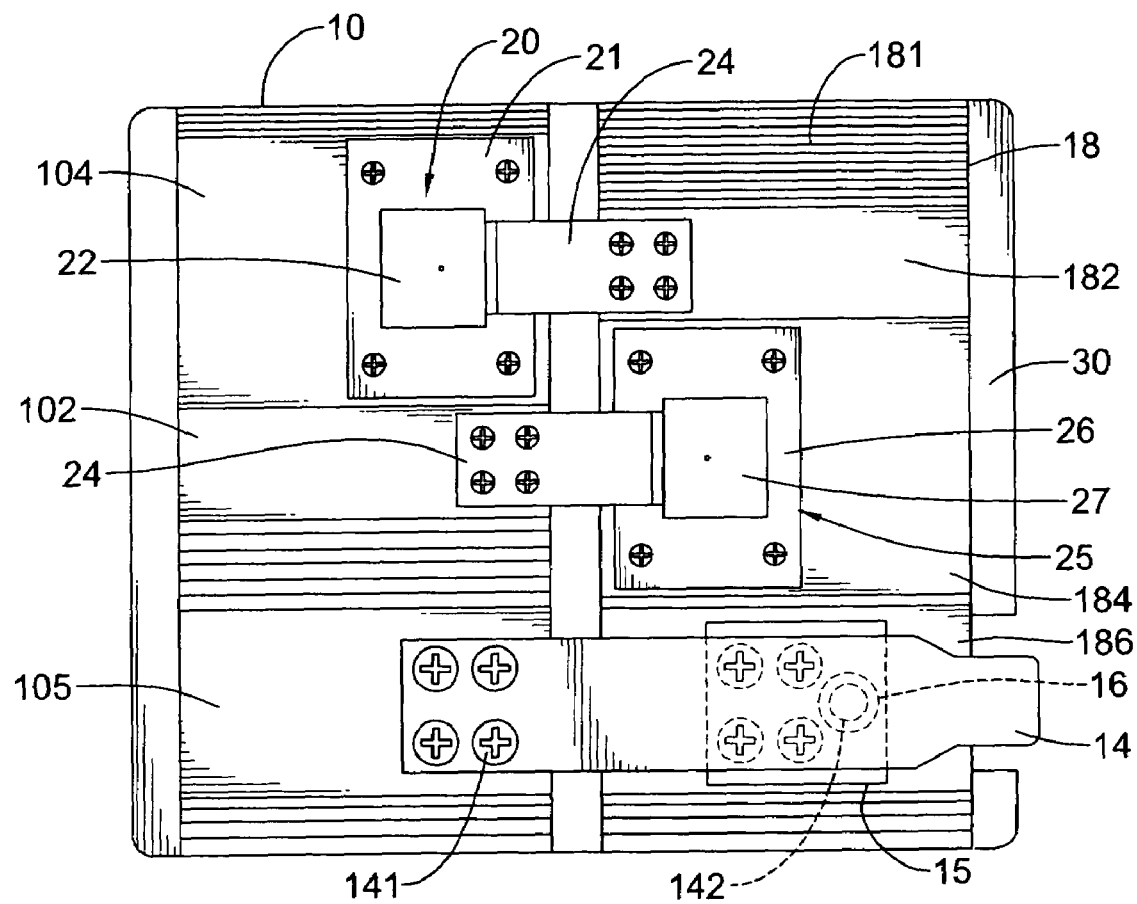
FIG. 6 is a side view of a phase member of a second embodiment of the power regulator with a bypass and splice capability in accordance with the present invention.

With further reference to FIG. 6, the first cooling fin (10) in the second embodiment has a first transverse recess (104), a second transverse recess (102) and a third transverse recess (106). The first transverse recess (104) is formed in the first face of the first cooling fin (10). The second transverse recess (102) is formed in the first face of the first cooling fin (10) and is adjacent to the first transverse recess (104). The third transverse recess (105) is formed in the first face of the first cooling fin (10) and is adjacent to the second transverse recess (102).

The second cooling fin (18) has a first transverse recess (184), a second transverse recess (182) and a fourth transverse recess (186). The first transverse recess (184) is formed in the first face of the second cooling fin (18) and is aligned with the second transverse recess (102) on the first cooling fin (10). The second transverse recess (182) is formed in the first face of the second cooling fin (18) and is aligned with the first transverse recess (104) of the first cooling fin (10). The fourth transverse recess (186) is formed in the first face of the second cooling fin (18) and is aligned with the third transverse recess (105) on the first cooling fin.

Figure 7:
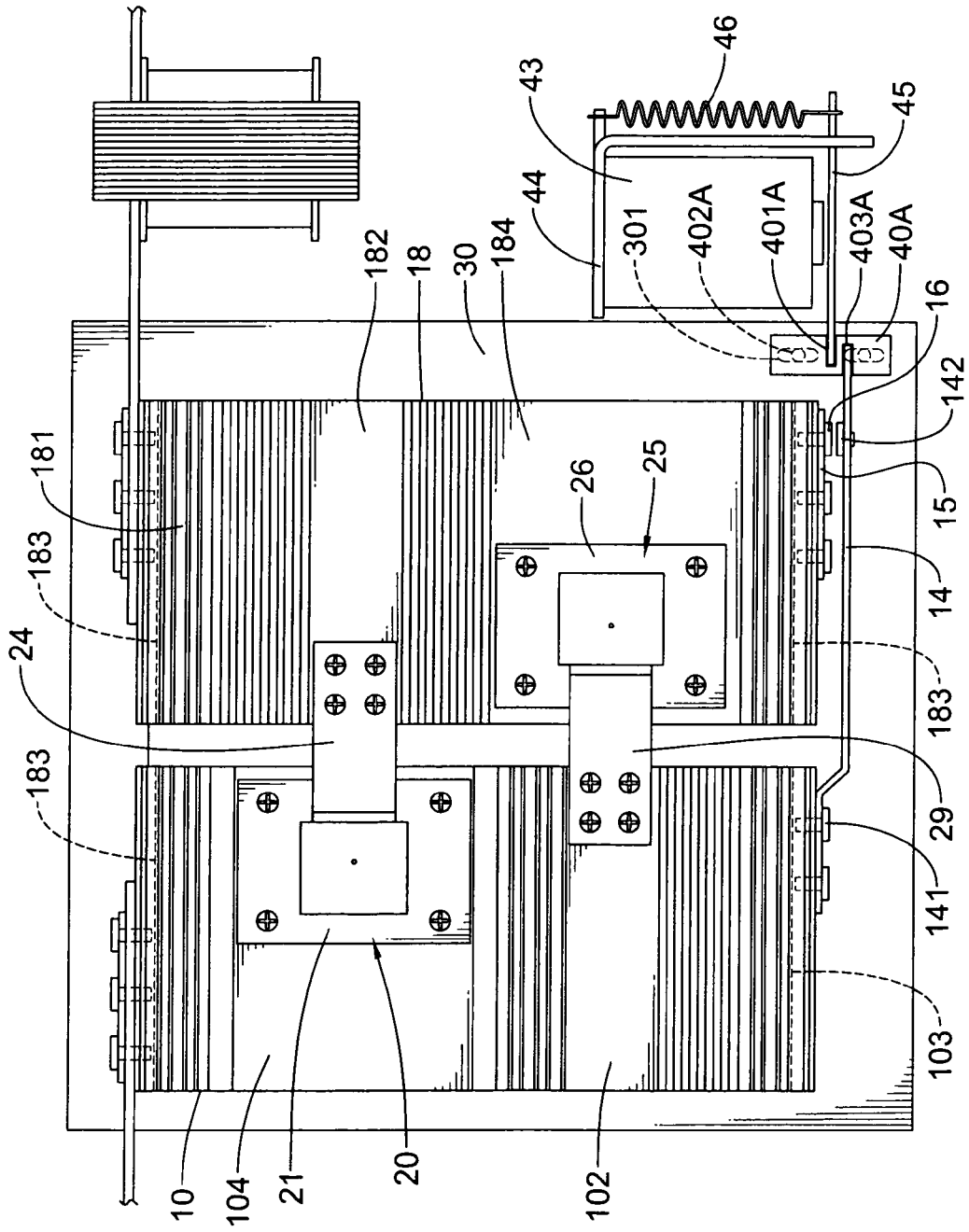
FIG. 7 is a side view of a phase member of a third embodiment of the power regulator with a bypass and splice capability in accordance with the present invention.
Figure 8:
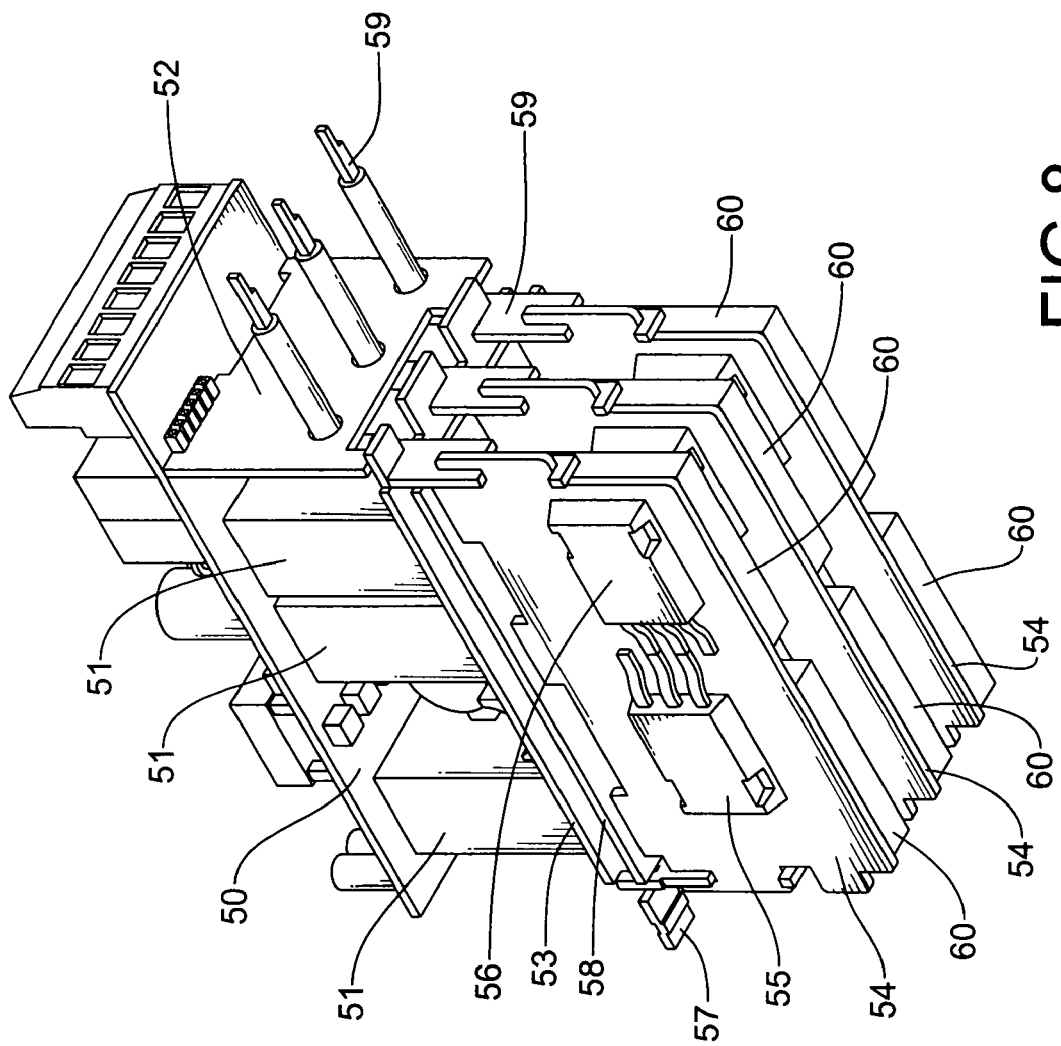
FIG. 8 is a perspective view of a conventional power regulator in accordance with the prior art.

With further reference to FIG. 7, the first cooling fin (10) in the third embodiment has a first transverse recess (104) and a second transverse recess (102). The first transverse recess is formed in the first face of the first cooling fin (10). The second transverse recess (102) is formed in the first face of the first cooling fin (10) and is adjacent to the first transverse recess (104). The second cooling fin (18) has a first transverse recess (184) and a second transverse recess (182). The first transverse recess (184) is formed in the first face of the second cooling fin (18) and is aligned with the second transverse recess (102) on the first cooling fin (10). The second transverse recess (182) is formed in the first face of the second cooling fin (18) and is aligned with the first transverse recess (104) of the first cooling fin (10).

The first SCR thyristor (20) is mounted on the first cooling fin (10) and the second cooling fin (18) and has an anode base (21), a cathode tab (24), an optional encapsulant (22) and an optional gate lead (23). The anode base (21) is metal, serves as an anode of the SCR thyristor (20) and is mounted in the first transverse recess (104) of the first cooling fin (10). The cathode tab (24) is metal, serves as a cathode of the SCR thyristor (20) and has a proximal end and a distal end. The distal end of the lead tab (24) extends to and is mounted in the second transverse recess (182) on the second cooling fin (18). The encapsulant (23) is mounted on the proximal end of the cathode tab (24) to encapsulate the SCR thyristor (20). The gate lead (22) is mounted in the encapsulant (23).

The second SCR thyristor (25) is inversely connected in parallel with the first SCR thyristor (20) to the first cooling fin (10) and the second cooling fin (18) and has an anode base (26), a cathode tab (29), an optional encapsulant (27) and an optional gate lead (28). The anode base (26) is metal, serves as an anode of the SCR thyristor (25) and is mounted in the first transverse recess (184) on the second cooling fin (18). The cathode tab (29) is metal, serves as a cathode of the SCR thyristor (20, 25) and has a proximal end and a distal end. The distal end of the cathode tab (29) extends to and is mounted in the second transverse recess (102) in the first cooling fin (10).

The encapsulant (28) is mounted on the proximal end of the cathode tab (29) to encapsulate the SCR thyristor (25). The gate lead (27) is mounted in the encapsulant (28).

When a motor is turned on and off, the SCR thyristors (20, 25) inversely connected in parallel allow voltage applied to the motor to increase and decrease gradually.

The conductive resilient tab (14) is attached to the first cooling fin (10), extends over the second cooling fin (18), extends beyond the outer edge of the second cooling fin (18) and has a distal end, a moveable contact (142) and multiple optional bolts (141). The distal end of the conductive resilient tab (14) extends beyond the outer edge of the second cooling fin (18). The moveable contact (142) is formed on the conductive resilient tab (14) and faces the second cooling fin (18). The bolts (141) attach the conductive resilient tab (14) to the first cooling fin (10).

In the first and second embodiments, the conductive resilient tab (14) is attached to the third transverse recess (105) of the first cooling fin (10) and extends over the fourth transverse recess (186) of the second cooling fin (18). The moveable contact (142) faces the fourth transverse recess (186) of the second cooling fin (18).

With reference to FIG. 7, the conductive resilient tab (14) in the third embodiment is attached to the mounting slot (103) on the lower edge of the first cooling fins (10) and extends over the lower edge of the second cooling fin (18). The moveable contact (142) faces the lower edge of the second cooling fin (18).

The conductive rigid tab (15) is attached to the second cooling fin (18) and has a stationary contact (16). The stationary contact (16) is formed on the conductive rigid tab (15) and aligns with the moveable contact (142).

In the first and second embodiments, the conductive rigid tab (15) is attached to the fourth transverse recess (186) on the second cooling fin (18)

In the third embodiment, the conductive rigid tab (15) is attached to the mounting slot (103) on the lower edge of the second cooling fin (18). Accordingly, height of the cooling fins (10, 18) can be decreased, and volume and molding cost of the cooling fins (10, 18) can be reduced when the conductive resilient tab (14) and the conductive rigid tab (15) are mounted in the lower edge of the cooling fins.

The conductive frames (17) are mounted respectively in the mounting slots (103) on the upper edges of the cooling fins (10) and serve as input and output terminals of the phase members (1, 2, 3).

The positioning boards (30) are insulating material, are connected respectively to faces of the first cooling fin (10) and the second cooling fin (18), and each positioning board (30) has multiple optional through holes (31), multiple optional bolts and a side edge and may have a mounting notch (32) or two guide slots (301). The through holes (31) align with the grooves in the cooling fins (10). The bolts extend respectively through the through holes (31) and screw into the grooves to hold the cooling fins (10, 18) side by side and adjacent to each other.

In the first and second embodiments, the mounting notch (31) is defined on the side edges of the positioning boards (30) and corresponds to the distal end of the conductive resilient tab (14).

In the third embodiment, the guide slots (301) are defined through the positioning boards (30) near the distal end of the conductive resilient tab (14).

The driver is mounted in the case, drives the distal end of the conductive resilient tab (14) back and forth to connect and disconnect the moveable contact (142) to and from the stationary contact (16), may comprise a mounting bracket (44), a pivoting arm (45), an electromagnet (43), a spring (46) and a connecting bar (40, 40A) and may have multiple fasteners (47).

The mounting bracket (44) is L-shaped, is mounted in the body (48) of the case and has a mounting end.

The pivoting arm (45) is mounted pivotally on the mounting end of the mounting bracket (44) and has a proximal end and a distal end.

The electromagnet (43) is mounted between the pivoting arm (45) and the mounting bracket (44). When the motor is turned on, the driver is energized, and the electromagnet (43) is excited. Then the pivoting arm (45) is attracted by the electromagnet (43), and the distal end of the pivoting arm (45) pivots toward the electromagnet (43).

The spring (46) is attached to the mounting bracket (44) and the pivoting arm (45), pulls the pivoting arm (45) away from the electromagnet (43) and has a proximal end and a distal end. The proximal end is attached pivotally to the mounting bracket (44). The distal end is attached to the proximal end of the pivoting arm (45). When the pivoting arm (45) is attracted by the electromagnet (43) and pivots, the spring (46) is stretched. When excitation of the electromagnet (43) is stopped, the spring (46) pulls the pivoting arm (45) away from the electromagnet (43) and repositions the pivoting arm (45).

The connecting bar (40, 40A) is mounted moveably on the positioning boards (30), is connected to the distal end of each conductive resilient tab (14) and the distal end of the pivoting arm (45) and selectively causes the moveable contact (142) on the conductive resilient tab (14) to connect to or disconnect from the stationary contact (16) on the conductive rigid tab (15).

In the first and second embodiment, the connecting bar (40) is mounted moveably in the mounting notches (32) in the positioning boards (30) and has an upper edge, a lower edge, an inner surface, an outer surface and two flanges (42). The inner surface faces the at least one phase member (1, 2, 3) and has at least one connecting slot (41). Each connecting slot (41) holds the distal end of the conductive resilient tab (14) of the corresponding phase member (1, 2, 3) so the moveable contact (142) moves with the connecting bar (40). The outer surface has a socket (401) that holds the distal end of the pivoting arm (45) so the connecting bar (40) moves with the pivoting arm (45). The flanges (42) are formed respectively on and protrude out from the upper and lower edges of the connecting bar (40).

In the third embodiment, the connecting bar (40A) is mounted moveably in the guide slots (301) in one of the positioning boards (30) and has an inner surface, an outer surface and two guide posts (402A). The outer surface has a connecting slot (403A) and a socket (401A). The connecting slot (403A) holds the distal end of the conductive resilient tab (14) so the moveable contact (142) moves with the connecting bar (40A). The socket (401A) holds the distal end of the pivoting arm (45) so the connecting bar (40, 40A) moves with the pivoting arm (45). The posts (402A) are mounted securely on and protrude from the inner surface of the connecting bar (40A) and correspond respectively to and are mounted moveably in the guide slots (301) in one of the positioning boards (30).

When the pivoting arm (45) pivots, the distal end of the pivoting arm (45) drives the connecting bar (40, 40A) and the distal end of the conductive resilient tab (14) back and forth.

The fasteners (47) slidably hold the first and second embodiments of the connecting bar (40) in the notches in the positioning boards (30) and have a longitudinal segment and a hook. The longitudinal segments are mounted in grooves in corresponding cooling fins (10). The hook slidably engages the corresponding flange (42) on the connecting bar (40) so the hooks holding both flanges (42) slidably hold the connecting bar (40) in the mounting notches (32) in the positioning boards (30).

When a motor with the power regulator is turned on and off, the SCR thyristors (20) inversely mounted in parallel cause voltage applied to the motor to increase and decrease gradually. When the motor is turned on, the driver is energized, and the electromagnet (43) is excited and attracts the pivoting arm (45). The distal end of the pivoting arm (45) pivots toward the electromagnet (43), and the connecting bar (40, 40A) connected to the pivoting arm (45) is moved. The distal end of the conductive resilient tab (14) connected to the connecting bar (40, 40A) is moved, and the moveable contact (142) makes contact with the stationary contact (16). Therefore, power bypasses the SCR thyristors (20) and is spliced through the cooling fins (10), and the cooling fins (10) serve as bypass relays when the motor is running for a long time.

The power regulator has the following advantages. The cooling fins (10) serve as bypass relays by moving the moveable contacts (142) mounted on the cooling fins (10). Accordingly, space for mounting the bypass relays and Cu—Pt leads for connecting the SCR thyristors (20) and the bypass relays is not needed, and volume and manufacturing cost of the power regulator can be reduced. Furthermore, heat generated by the SCR thyristors (20) and the cooling fins (10) is dissipated rapidly by the cooling fins (10), and temperature increase of the power regulator is reduced, which improves operation efficiency of the power regulator.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A power regulator with a bypass and splice capability comprising
   a case;
   at least one phase member being mounted in the case, and each one of the at least one phase member comprising
      a first cooling fin being conductive and having
         an upper edge;
         a lower edge;
         a first face;
         a second face;
         an inner edge;
         an outer edge; and
         a first transverse recess being defined in one of the faces of the first cooling fin;
         a second transverse recess being defined in one of the faces of the first cooling fin;
      a second cooling fin being conductive, being arranged side-by-side to the first cooling fin and having
         an upper edge;
         a lower edge;
         a first face corresponding to and being aligned with the first face of the first cooling fin;
         a second face corresponding to and being aligned with the second face of the first cooling fin;
         an inner edge facing and being adjacent to the inner edge of the first cooling fin;
         an outer edge; and
         a first transverse recess being defined in one of the faces of the second cooling fin and corresponding to the second transverse recess in the first cooling fin;
         a second transverse recess being defined in one of the faces of the second cooling fin and corresponding to the first transverse recess in the first cooling fin;
      a first SCR thyristor being mounted on the first cooling fin and second cooling fin and having
         an anode base being metal and being mounted in the first transverse recess on the first cooling fin; and
         a cathode tab being metal and having
            a proximal end;
            a distal end extending to and being mounted in the second transverse recess on the second cooling fin;
      a second SCR thyristor being inversely connected in parallel with the first SCR thyristor to the first cooling fin and the second cooling fin and having
         an anode base being metal and being mounted in the first transverse recess on the second cooling fin; and
         a cathode tab being metal and having
            a proximal end;
            a distal end extending to and being mounted in the second transverse recess in the first cooling fin;
      a conductive resilient tab being attached to the first cooling fin, extending over the second cooling fin, extending beyond the outer edge of the second cooling fin and having
         a distal end extending beyond the outer edge of the second cooling fin; and
         a moveable contact being formed on the conductive resilient tab and facing the second cooling fin; and
      a conductive rigid tab being attached to the second cooling fin and having a stationary contact being formed on the conductive rigid tab and aligning with the movable contact on the conductive resilient tab; and
   a driver being mounted in the case, driving the distal end of the conductive resilient tab back and forth to connect and disconnect the moveable contact to and from the stationary contact.

2. The power regulator as claimed in claim 1, wherein each one of the at least one phase member further comprises two positioning boards being insulating material, being connected respectively to faces of the first cooling fin and the second cooling fin and having a side edge.

3. The power regulator as claimed in claim 2, wherein the driver comprises
   a mounting bracket being L-shaped, being mounted in the case and having a mounting end;
   a pivoting arm being mounted pivotally on the mounting end of the mounting bracket and having
      a proximal end; and
      a distal end;
   an electromagnet being mounted between the pivoting arm and the mounting bracket;
   a spring being attached to the mounting bracket and the pivoting arm, pulling the pivoting arm away from the electromagnet and having
      a proximal end attached pivotally to the mounting bracket; and
      a distal end attached to the proximal end of the pivoting arm; and
   a connecting bar being mounted moveably on the positioning boards, being connected to the distal end of the conductive resilient tab of each one of the at least one phase member and the distal end of the pivoting arm.

4. The power regulator as claimed in claim 3, wherein
the first cooling fin of each one of the at least one phase member further has a third transverse recess formed in the first face of the first cooling fin;
the second cooling fin of each one of the at least one phase member further has a fourth transverse recess formed in the first face of the second cooling fin and corresponding to the third transverse recess of the first cooling fin;
the conductive resilient tab on the first cooling fin of each one of the at least one phase member is attached to the third transverse recess in the first cooling fin; and
the conductive rigid tab on the second cooling fin of each phase member is attached to the fourth transverse recess in the second cooling fin.

5. The power regulator as claimed in claim 4, wherein
the positioning boards of each one of the at least one phase member have notches formed respectively in side edges of the positioning boards and aligning with the distal end of the conductive resilient tab; and
the connecting bar of the driver is mounted moveably in the mounting notches in the positioning boards.

6. The power regulator as claimed in claim 5, wherein
each cooling fin further has
multiple ridges being formed on the faces of the cooling fin adjacent to the transverse recesses in the cooling fin; and
multiple grooves being defined between the ridges.

7. The power regulator as claimed in claim 6, wherein
the connecting bar of the driver has
an upper edge;
a lower edge;
an inner surface facing the at least one phase member and having at least one connecting slot, each one of the at least one connecting slot holding the distal end of the conductive resilient tab of the corresponding phase member; and
an outer surface having a socket that holds the distal end of the pivoting arm; and
two flanges being formed respectively on and protruding out from the upper and lower edges of the connecting bar; and
the driver further comprises multiple fasteners that hold the connecting bar in the notches in the positioning boards, and each fastener having a longitudinal segment being mounted in grooves on a corresponding cooing fin; and
a hook slidably engaging the corresponding flange on the connecting bar.

8. The power regulator as claimed in claim 3, wherein
each cooling fin further has a mounting slot defined in the lower edge of the cooling fin; and
the conductive resilient tab of each one of the at least one phase member is attached to the mounting slot in the lower edge of the corresponding first cooling fin; and
the conductive rigid tab of each one of the at least one phase member is attached to the mounting slot in the lower edge of the corresponding second cooling fin.

9. The power regulator as claimed in claim 8, wherein
the power regulator has one phase member;
each positioning board of the phase member further has two guide slots defined through the positioning board near the distal end of the conductive resilient tab; and
the connecting bar of the driver is mounted moveably in the guide slots of one of the positioning boards.

10. The power regulator as claimed in claim 9, wherein
the connecting bar of the driver has
an upper edge;
a lower edge;
an outer surface having
a connecting slot holding the distal end of the conductive resilient tab;
a socket holding the distal end of the pivoting arm;
an inner surface; and
two guide posts being mounted securely on and protruding from the inner surface of the connecting bar and corresponding respectively to and being mounted moveably in the guide slots in one of the positioning boards.

11. The power regulator as claimed in claim 1, wherein
each cooling fin further has
multiple ridges being formed on the faces of the cooling fin adjacent to the first and second transverse recesses of the cooling fin; and
multiple grooves being defined between the ridges.

12. The power regulator as claimed in claim 1, wherein
each cooling fin further has a mounting slot defined in the upper edge of the cooling fin; and
each one of the at least one phase member further comprises two conductive frames mounted respectively in the mounting slots on the upper edges of the cooling fins.

* * * * *